United States Patent [19]

Cook et al.

[11] Patent Number: 5,687,319
[45] Date of Patent: Nov. 11, 1997

[54] METHOD AND SYSTEM FOR DETERMINING MAXIMUM CABLE SEGMENTS BETWEEN ALL POSSIBLE NODE TO NODE PATHS ON A SERIAL BUS

[75] Inventors: Sherri E. Cook, Boca Raton; Andrew B. McNeill, Jr., Deerfield Beach, both of Fla.

[73] Assignee: International Business Machines Corporation, Armonk, N.Y.

[21] Appl. No.: 761,058

[22] Filed: Dec. 5, 1996

Related U.S. Application Data

[63] Continuation of Ser. No. 312,746, Sep. 27, 1994, abandoned.
[51] Int. Cl.$^6$ .................................................. G06F 15/163
[52] U.S. Cl. ........................... 395/200.13; 395/200.15; 395/311; 395/651; 395/800
[58] Field of Search ..................... 395/200.13, 200.15, 395/311, 651, 800

[56] References Cited

U.S. PATENT DOCUMENTS

| | | | |
|---|---|---|---|
| 4,410,940 | 10/1983 | Carlson et al. | 395/650 |
| 4,466,060 | 8/1984 | Riddle | 395/200.15 |
| 4,987,536 | 1/1991 | Humblet | 395/200.15 |
| 5,414,839 | 5/1995 | Joshi | 395/650 |

OTHER PUBLICATIONS

"IEEE Standard for a High Performance Serial Bus", The Institute Of Electrical And Electronic Engineers, Inc., Draft 7.1v1, IEEEP1394, Aug. 5, 1994.

Marazas, et al., "Information Technology—SCSI-3 Serial Bus Protocol (SBP)", X3T10 992D, Rev. 18, Working Draft, Aug. 11, 1994.

*Primary Examiner*—Jack B. Harvey
*Assistant Examiner*—Jeffrey K. Seto
*Attorney, Agent, or Firm*—Bernard D. Bogdon

[57] ABSTRACT

A method and system for determining the maximum number of cable segments between all possible node to node paths on a high performance serial bus. The method for determining the maximum cable hops on the serial bus, which is acyclic and based upon the IEEE 1994 standard, consists of traversing a direct path between two nodes via the parent links. Further, the number of traversed paths is reduced from all possible node-to-node paths to only leaf-to-leaf node paths and leaf-to-root node paths for efficiently identifying the maximum number of cable segments between any two nodes within the serial bus.

8 Claims, 4 Drawing Sheets

METHOD AND SYSTEM FOR DETERMINING MAXIMUM CABLE SEGMENTS BETWEEN ALL POSSIBLE NODE TO NODE PATHS ON A SERIAL BUS

This application is a continuation of application Ser. No. 08/312,746, filed Sep. 27, 1994, now abandoned.

CROSS-REFERENCE TO RELATED APPLICATION

The present application is related to U.S. patent application Ser. No. 08/313,680, entitled "Method And System For Matching Packet Size For Efficient Transmission Over a Serial Bus," U.S. patent application Ser. No. 08/312,854, entitled "Acyclic Cable Bus Having Redundant Path Access", U.S. patent application Ser. No. 08/313,679, entitled "Method For Generating Topology Map For A Serial Bus", U.S. patent application Ser. No. 08/313,483, entitled "Method For Selecting Transmission Speeds For Transmitting Data Packets Over A Serial Bus", U.S. patent application Ser. No. 08/313,490, entitled "Method And System For Automatically Generating A Read Response Packet With Speed Matching Over A Serial Bus", U.S. patent application Ser. No. 08/313,638, entitled "Method And System For Dynamically Appending Data To Data Structures For Transmission Over A Serial Bus", and all filed of even date herewith by the inventors hereof and assigned to the assignee herein, and incorporated by reference herein.

Notice: © Copyright, International Business Machines Corporation 1994: A portion of the Disclosure of this patent document contains material which is subject to copyright protection. The copyright owner has no objection to facsimile reproduction by anyone of the patent document or the patent disclosure, as it appears in the U.S. Patent and Trademark Office, patent file or records, but otherwise reserves all rights in its copyright whatsoever.

BACKGROUND OF THE INVENTION

1. Technical Field

The present invention relates, generally, to the transmission of data over a bus having multiple transmission rates, and, more particularly, to determining the maximum number of cable segments between all possible node to node paths on a high performance acyclic serial bus so as to minimize the interpacket transmission gap time thereon.

2. Description of the Related Art

The IEEE has proposed a new standard under IEEE 1394 for a high performance serial bus cable environment that includes a network of nodes connected by point-to-point links called physical connections. The physical connections consist of a port on each of the nodes and the cable between them. A node can have multiple ports, which allows a branching multi-hop interconnect. The limitations on this topology are set by the requirement for the fixed round-trip time needed for the arbitration protocol. The default timing set after a bus reset is adequate for 16 cable hops, each of 4.5 meters for a total of 72 meters. The maximum number of nodes supported on a single bus is 63.

The 1394 cable environment supports multiple data rates of 98.304, 198.608, 393.216 megabits per second. The lowest speed is known as the base rate, and all ports that support a higher data rate must also support the lower data rate. Nodes capable of data rates greater than the base rate exchange speed information with its peers through its attached ports during the speed signalling phase of normal bus arbitration. If a peer node is incapable of receiving high speed data, then data will not be propagated down that path. Data will only be propagated down paths that support the higher data rate.

Whenever a node is added to or removed from the 1394 serial bus, a bus reset occurs that forces all nodes to a known state. After a bus reset, the tree identify (ID) process translates the general network topology into a tree, where one node is designated a root and all of the physical connections are labeled as either a parent, a child, or as unconnected. Any unconnected ports are labeled as off and do not participate any further. The tree must be acyclic, meaning no loops allowed; otherwise, the tree ID process will not be completed.

After the tree ID phase, the next step is the self ID phase, which results in each node being assigned a unique physical ID. During the self ID phase, each node on the bus is given an opportunity to transmit one to four short, or runt, packets onto the cable that includes the physical ID, port connection status, and some management information. The physical ID is simply the count of the number of times a node passes through the state of receiving self ID information before having its own opportunity to do so. Based on the information in the self ID packet, power management can be performed and bus topological information can be obtained.

The self ID process uses a deterministic selection process where the root node passes control of the media to the node attached to its lowest numbered connected port and waits for that node to signal that it and all of its children have transmitted their serf ID packets. The root then passes control to its next highest port and waits for that node to finish. When the nodes attached to all the root's ports have finished, the root itself transmits its self ID packet. The child nodes use the same process in a recursive manner. Once this process completes, the serf ID phase is complete and all information necessary to determine the bus topology is contained in the self ID packets that were transmitted.

In order to achieve optimum bus performance on the 1394 serial bus, the interpacket transmission gap time should be set as small as possible. The interpacket gap is a period of time during which the bus is unasserted. There are four types of gaps. The first type is the acknowledge gap, which appears between the end of a packet and the acknowledge signal. The second type is an isochronous gap, which appears before channels or isochronous packets. The third is a subaction gap, which appears before asynchronous packets within a fairness interval. The fourth is an arbitration reset gap, which appears before asynchronous packets when the fairness interval starts. These interpacket gap times are based on the maximum number of cable segments, or hops, between any two devices and, therefore, depend on the bus topology.

SUMMARY OF THE INVENTION

It is therefore an object of the present invention to determine the maximum number of cable segments on a high performance acydic serial bus so as to minimize the interpacket transmission gap time thereon.

The foregoing object is achieved as is now described. According to the present invention, a method and system for determining the maximum number of cable segments on a high performance serial bus is disclosed. The method for determining the maximum cable hops on the serial bus, which is acyclic and based upon the IEEE 1994 standard, consists of traversing a direct path between two nodes via the parent links. Further, the number of traversed paths is reduced from all possible node-to-node paths to only leaf-to-leaf node paths and leaf-to-root node paths for efficiently identifying the maximum number of cable segments between any two nodes within the serial bus network.

The above as well as additional objectives, features, and advantages of the present invention will become apparent in the following detailed written description.

BRIEF DESCRIPTION OF THE DRAWINGS

The novel features characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1A:
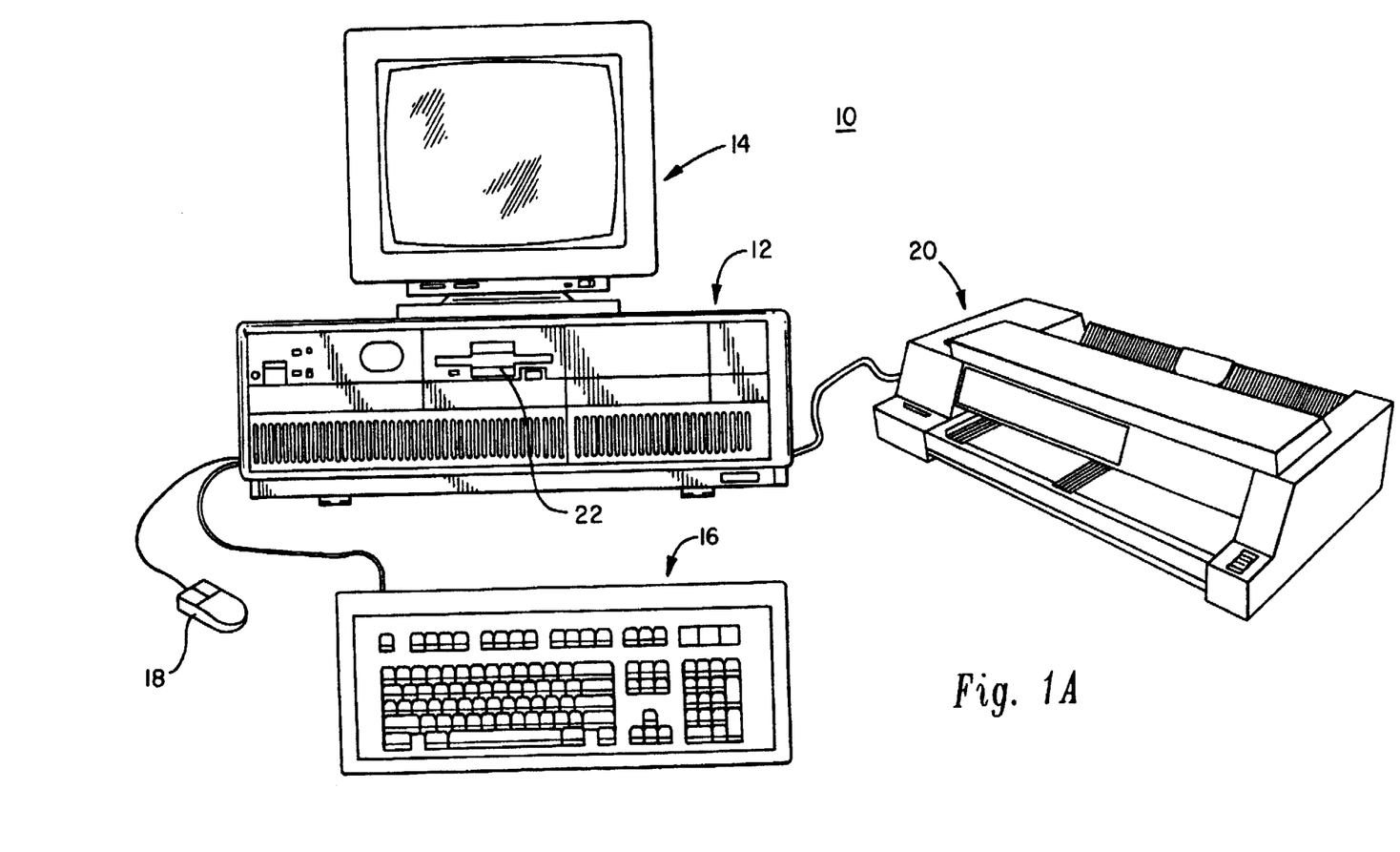
FIG. 1A depicts a data processing system in the form of a personal computer in which the present invention can be employed is depicted.

Referring now to the figures, and in particular to FIG. 1A, a data processing system, personal computer system 10, in which the present invention can be employed is depicted. As shown, personal computer system 10 comprises a number of components, which are interconnected together. More particularly, a system unit 12 is coupled to and can drive an optional monitor 14 (such as a conventional video display). A system unit 12 also can be optionally coupled to input devices such as a PC keyboard 16 or a mouse 18. Mouse 18 includes right and left buttons (not shown). The left button is generally employed as the main selector button and alternatively is referred to as the first mouse button or mouse button 1. The right button is typically employed to select auxiliary functions as explained later. The right mouse button is alternatively referred to as the second mouse button or mouse button 2. An optional output device, such as a printer 20, also can be connected to the system unit 12. Finally, system unit 12 may include one or more mass storage devices such as the diskette drive 22.

As will be described below, the system unit 12 responds to input devices, such as PC keyboard 16, the mouse 18, or local area networking interfaces. Additionally, input/output (I/O) devices, such as floppy diskette drive 22, display 14, printer 20, and local area network communication system are connected to system unit 12 in a manner well known. Of course, those skilled in the art are aware that other conventional components also can be connected to the system unit 12 for interaction therewith. In accordance with the present invention, personal computer system 10 includes a system processor that is interconnected to a random access memory (RAM), a read only memory (ROM), and a plurality of I/O devices.

In normal use, personal computer system 10 can be designed to give independent computing power to a small group of users as a server or a single user and is inexpensively priced for purchase by individuals or small businesses. In operation, the system processor functions under an operating system, such as IBM's OS/2 operating system or DOS. OS/2 is a registered trademark of International Business Machines Corporation. This type of operating system includes a Basic Input/Output System (BIOS) interface between the I/O devices and the operating system. BIOS, which can be stored in a ROM on a motherboard or planar, includes diagnostic routines which are contained in a power on self test section referred to as POST.

Figure 1B:
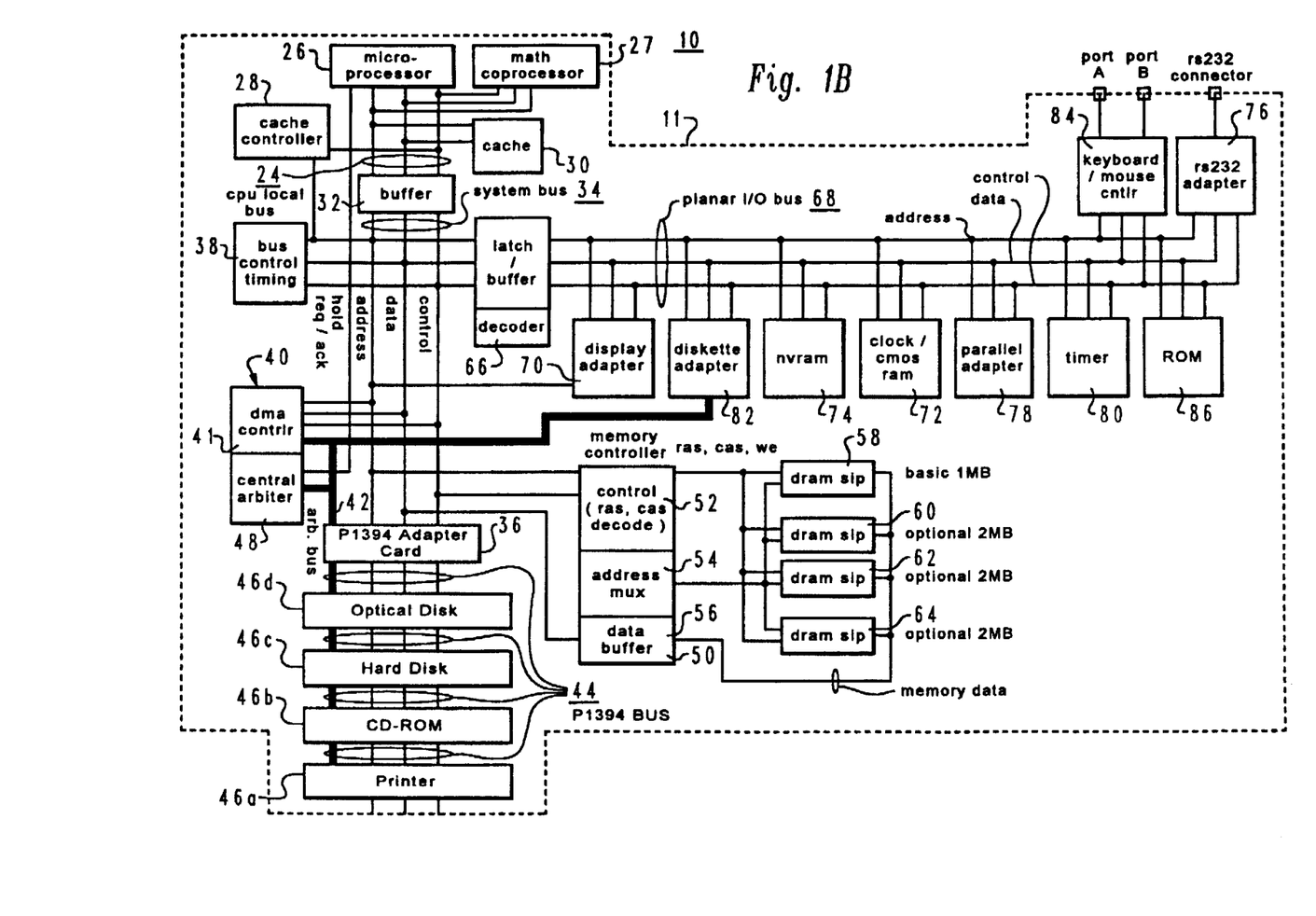
FIG. 1B is a block diagram of a personal computer system illustrating the various components of personal computer system in accordance with the present invention.

Prior to relating the above structure to the present invention, a summary of the operation in general of personal computer system 10 may merit review. Referring to FIG. 1B, there is shown a block diagram of personal computer system 10 illustrating the various components of personal computer system 10 in accordance with the present invention. FIG. 1B further illustrates components of planar 11 and the connection of planar 11 to I/O slots 46a–46d and other hardware of personal computer system 10. Connected to planar 11 is the system central processing unit (CPU) 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used for CPU 26, one suitable microprocessor is the Pentium microprocessor, which is sold by Intel Corporation. "Pentium" is a trademark of Intel Corporation.

While the present invention is described hereinafter with particular reference to the system block diagram of FIG. 1B, it is to be understood at the outset of the description which follows, it is contemplated that the apparatus and methods in accordance with the present invention may be used with other hardware configurations of the planar board. For example, the system processor could be an Intel 80286, 80386, or 80486 microprocessor. These particular microprocessors can operate in a real addressing mode or a protected addressing mode. Each mode provides an addressing scheme for accessing different areas of the microprocessor's memory.

Returning now to FIG. 1B, CPU local bus 24 (comprising data, address and control components) provides for the connection of CPU 26, an optional math coprocessor 27, a cache controller 28, and a cache memory 30. Also coupled on CPU local bus 24 is a buffer 32. Buffer 32 is itself connected to a slower speed (compared to the CPU local bus) system bus 34, also comprising address, data and control components. System bus 34 extends between buffer 32 and a P1394 adapter card 36. System bus 34 is further connected to a bus control and timing unit 38 and a Direct Memory Access (DMA) unit 40. DMA unit 40 is comprised of a central arbitration unit 48 and a DMA controller 41. P1394 adapter card 36 provides an interface between the system bus 34 and the P1394 Serial Bus 44. Connected to P1394 bus 44 are a plurality of devices or nodes 46a–46d such as optical disk, hard disk, CD-ROM, etc. In the depicted example, node 46c is a hard disk drive, node 46b is a CD-ROM drive, and node 46a is a printer device connected to it. An arbitration control bus 42 couples the DMA controller 41 and central arbitration unit 48 to I/O slots 46 and diskette adapter 82. Also connected to system bus 34 is a memory control unit 50 which is comprised of a memory controller 52, an address multiplexor 54, and a data buffer 56. Memory control unit 50 is further connected to a random access memory as represented by RAM module 58. Memory controller 52 includes the logic for mapping addresses to and from CPU 26 to particular areas of RAM 58. While the personal computer system 10 is shown with a basic 1 megabyte RAM module, it is understood that additional memory can be interconnected as represented in FIG. 1B by the optional memory modules 60 through 64.

A further buffer 66 is coupled between system bus 34 and a planar I/O bus 68. Planar I/O bus 68 includes address, data, and control components respectively. Coupled along planar bus 68 are a variety of I/O adapters and other peripheral components such as display adapter 70 (which is used to drive an optional display 14), a clock 72, nonvolatile RAM 74 (hereinafter referred to as "NVRAM"), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

Clock 72 is used for time of day calculations. NVRAM 74 is used to store system configuration data. That is, the NVRAM will contain values which describe the present configuration of the system. For example, NVRAM 74 contains information which describe the capacity of a fixed disk or diskette, the type of display, the amount of memory, etc. Of particular importance, NVRAM 74 will contain data which is used to describe the system console configuration; i.e., whether a PC keyboard is connected to the keyboard/ mouse controller 84, a display controller is available or the ASCII terminal is connected to RS232 adapter 76. Furthermore, these data are stored in NVRAM 74 whenever a special configuration program is executed. The purpose of the configuration program is to store values characterizing the configuration of this system to NVRAM 76 which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

Specifically, personal computer system 10 may be implemented utilizing any suitable computer such as the IBM PS/2 computer or an IBM RISC SYSTEM/6000 computer, both products of International Business Machines Corporation, located in Armonk, N.Y. "RISC SYSTEM/ 6000" is a trademark of International Business Machines Corporation and "PS/2" is a registered trademark of International Business Machines Corporation.

Since P1394 nodes within the computer system of FIG. 1A may be interconnected in various acyclic topological configurations (tree, daisychain, or combination of both), there needs to be a method by which a bus topology map can be constructed using the self ID packets in order to determine the maximum number of cable hops between any two devices, or nodes, for tuning the interpacket transmission gap timing, in order to minimize packet transmission time between any two nodes in the computer system.

In order to determine the maximum number of cable segments, or hops between all possible node to node paths, on an IEEE 1394 High Performance Serial bus, a topological map of bus nodes, or devices, and interconnections, or cable segments, is necessary. The topology map is built into the following data structure during configuration management.

```
2struct node_info
{
    unsigned char parent;           // number of parents & parent of node
    unsigned char children;         // number of children
    unsigned int speed      :2;     // speed of this node         2 bits
    unsigned int gap_cnt    :6;     // gap count                  6 bits
    unsigned int link       :1;     // link power status          1 bit
    unsigned int power      :3;     // power class                3 bits
    unsigned int config_mgrc :1;    // config manager capable     1 bit
    unsigned int speed2init :2;     // speed from node to initiator
    unsigned int leaf       :1;     // leaf node = 1, non-leaf node = 0
} node {MAX_DEVICES};               // array of nodes
```

This 4-byte structure represents all information associated with a single node. An array of structures represents all information associated with multiple nodes, with the node ID used as a direct index into the array.

Because each child node has only a single parent node, except the root node, which does not have a parent, the topology map can be represented by only storing the parent associated with each node. This information is stored directly in an array. Thus, an array of parents represents the full topology with the index as the child node. The system relies on this parent knowledge to determine the maximum number of cable segments. With this parent information, the system can traverse a direct path between any two nodes in the topology in an efficient manner.

Figure 2:
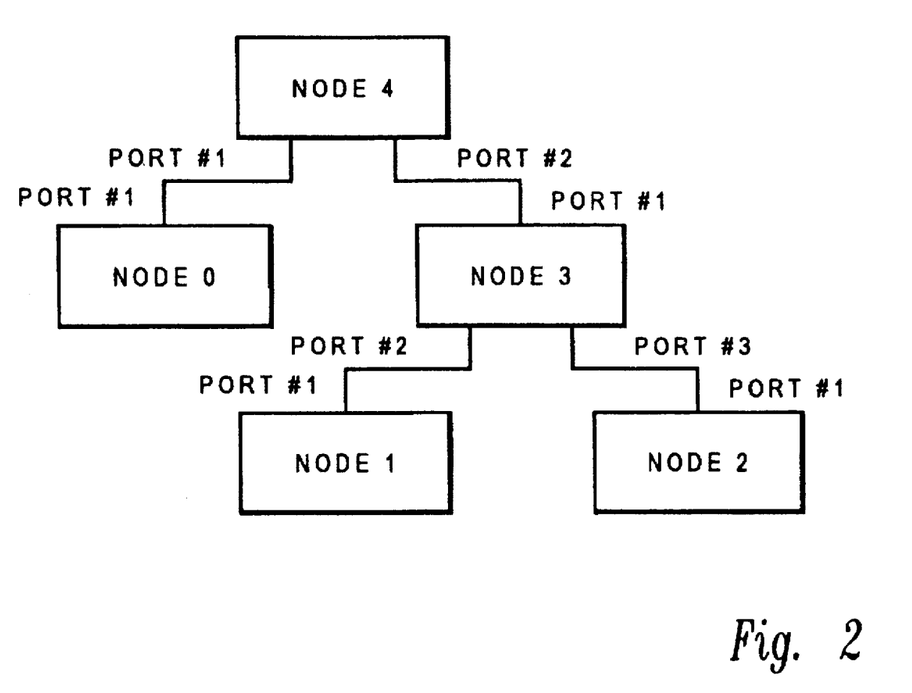
FIG. 2 is a block diagram representing a tree topology network node arrangement according to the present invention; and, FIG. 3 depicts a flowchart illustrating a method for determining the maximum number of cable segments between all possible node to node paths according to the present invention.

The topology information from FIG. 2 is represented by the following array information:

| node | parent |
|------|--------|
| 0    | 4      |
| 1    | 3      |
| 2    | 3      |
| 3    | 4      |
| 4    | X (root has no parent) |

A representative network is found in FIG. 2, which has five nodes. Node 4 is the root node while nodes 0, 1, 2 are leaf nodes. Node 3 is the parent node of nodes 1 and 2 and is a child node of node 4.

In determining the maximum number of cable hops, the system relies on the following information from the IEEE 1394 High Performance Serial Bus standard, herein incorporated by reference. First, the root is always the highest node ID on the bus. Second, each node has at most one parent. Third, with the exception of the root, a node with zero children is considered a leaf; a leaf node has only one connected port, which is a parent port. Fourth, with the exception of the root, a node with one or more children is considered a branch, since a branch node has two or more connected ports; these ports are one parent port and one or more child ports. For the purpose of the topology mapping algorithm, the root is always processed as a branch, except for the single node case. Fifth, each parent has a higher node ID than each of its children from the serf ID process.

Figure 3:
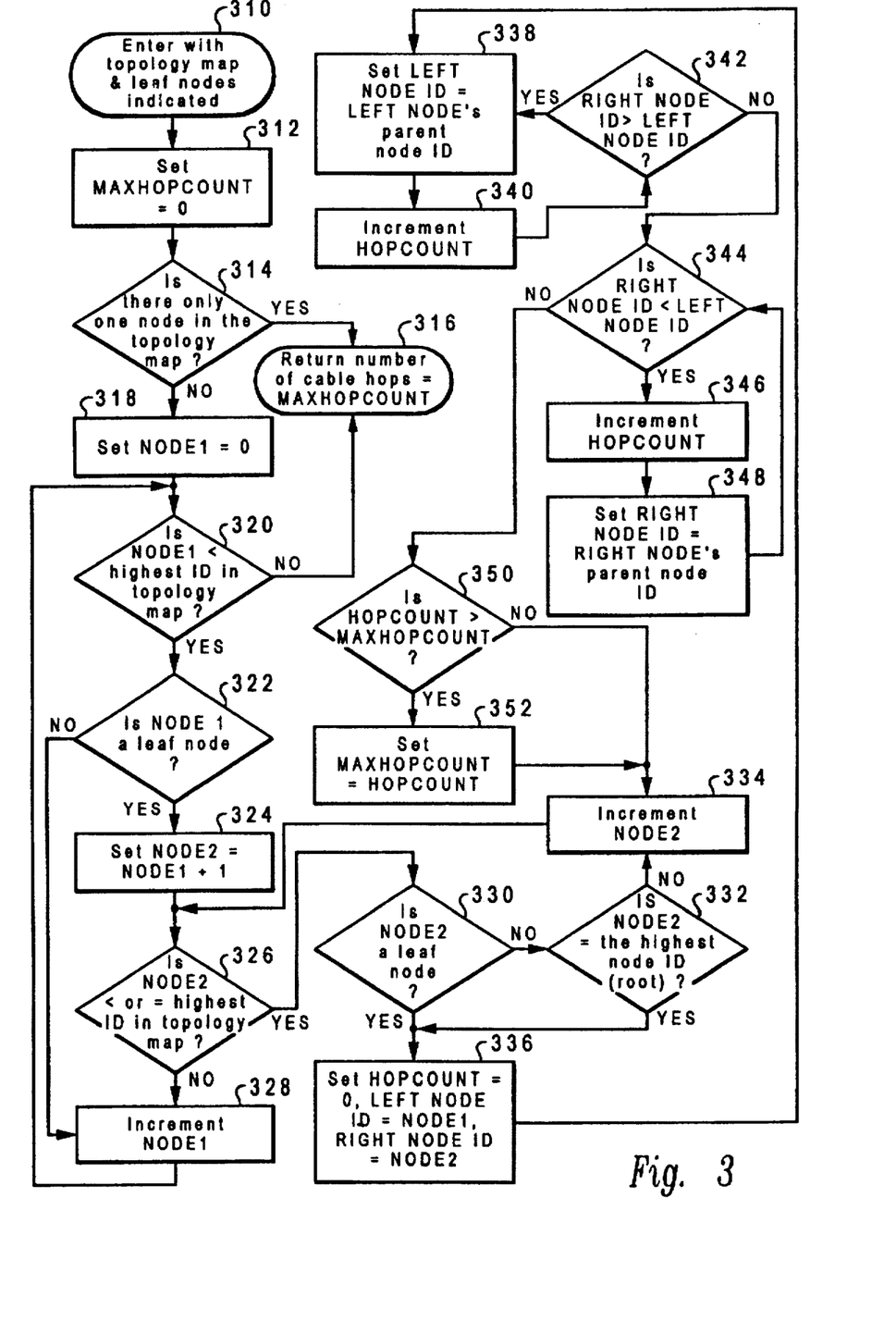

The system for determining cable hops works by adding up the cable connections between two nodes, one node being the source node and the other node being the destination node. The two nodes for a given path are looked at as branches in a tree, one being the left branch, and the other being the right branch. Each hop is counted as the branches are traversed via the parent links until a common ancestor is reached. The common ancestor is determined by finding the node whose ID is greater than or equal to the ID of the node at the end of the opposite branch of the path being traversed. It is noted that by traversing the parent links, the most direct path between two nodes can be obtained and is thus the most efficient approach. This approach is applied to each of the possible node-to-node paths. Only the leaf-to-leaf node paths and the leaf-to-root node paths are traversed. As these paths are traversed, the hop counts are generated and the highest one is saved as the maximum. The method for determining the maximum cable segments within the serial bus is shown in the flowchart of FIG. 3. The flowchart is based upon the programming code, which is in C language, found in Appendix A.

To begin, the system in step 310 enters with the topology map and leaf nodes indicated. In step 312, the system sets the maximum hop count, MAXHOPCOUNT, equal to zero. In step 314, the system determines whether there is only one node in the topology map and if so, in step 316, the system returns the number of cable hops being equal to the MAXHOPCOUNT currently set. Otherwise, the system, in step 318, sets the first node, node1, equal to zero. Then, in Step 320, the system determines whether node1 is less than the highest ID in the topology map and if it is not, the system proceeds to step 316. Otherwise, in step 322, the system determines if the node1 is a leaf node.

If node1 is a leaf node, in step 324, the system sets node2, equal to node1 and incremented by 1. Next, in step 326, the system determines whether node2 is less than or equal to the highest node ID in the topology map and if not, proceeds to step 328. Also, if node1 is not a leaf node, the system then increments node1 by I and then proceeds to step 320.

If node2 is less than or equal to the highest node ID in the topology map, then the system, in step 330, determines whether node2 is a leaf node and if not, proceeds to step 332. The system, in step 332, determines whether node2 is equal to the highest node ID, or root node. If not, the system, in step 334, increments node2 by 1 and returns to step 326. If node2 is a leaf node or node2 is the highest node or root node ID, the system, in step 336, sets the hop count equal to zero and the left node ID equal to node1 and the right node ID equal to node2.

Next, in step 338 the system sets the left node ID to be equal to the left node's parent node ID. In step 340, the system then increments the hop count by 1. In step 342, the system determines whether the right node ID is greater than the left node ID and if ,so, the system returns to step 338. Otherwise, the system proceeds to step 344, where the system determines whether the right node ID is less than the left node ID and if so, proceeds to step 346. In step 346, the system increments the hop count by one and in step 348, the system sets the right node ID equal to the right node's parent node ID and then returns to step 344. If the right node ID is not less than the left node ID (step 344), the system proceeds to step 350 where it is determined if the hop count value is greater than the MAXHOPCOUNT value currently stored, and if not the system proceeds to step 334. If the hop count is greater than the MAXHOPCOUNT, the system, in step 352, sets the MAXHOPCOUNT equal to the HOPCOUNT before proceeding to step 334. The system is complete once the system returns the number of cable hops equal to the number of MAXHOPCOUNT in step 316.

Table 1 shows a trace of the maximum hop count method according to FIG. 3 as applied to the topology in FIG. 2.

| node1 (left) | node2 (right) | left path traversal | right path traversal | hops | maxhops |
| --- | --- | --- | --- | --- | --- |
| 0 | 1 | 0 to 4 | | 1 | 0 |
| | | | 1 to 3 | 2 | |
| | | | 3 to 4 | 3 | 3 |
| 0 | 2 | 0 to 4 | | 1 | |
| | | | 2 to 3 | 2 | |
| | | | 3 to 4 | 3 | 3 |
| 0 | 3 | ignore path — node 3 is not a leaf or a root node | | | |
| 0 | 4 | 0 to 4 | no branch | 1 | 3 |
| 1 | 2 | 1 to 3 | | 1 | |
| | | | 2 to 3 | 2 | 3 |
| 1 | 3 | ignore path — node 3 is not a leaf or a root node | | | |
| 1 | 4 | 1 to 3 | no branch | 1 | |
| | | 3 to 4 | | 2 | 3 |
| 2 | 3 | ignore path — node 3 is not a leaf or a root node | | | |
| 2 | 4 | 2 to 3 | no branch | 1 | |
| | | 3 to 4 | | 2 | 3 |
| 3 | 4 | ignore path — node 3 is not a leaf or a root node | | | |

The only node pair paths that are traversed are those either from leaf-to-leaf nodes or from leaf-to-root nodes. Thus, only nodes 0 to 1, 0 to 2, 0 to 4, 1 to 2, 1 to 4, and 2 to 4 are to be traversed. It is also noted that the total possible node-to-node paths in this example is the total number of nodes squared, or 5*5=25. The total of node-to-node paths can be reduced by recognizing that the longest cable path can only be from a leaf node to another leaf node or from a leaf node to another root node. Thus, this method is efficient because it reduces the number of node-to-node paths that need to be traversed from a possible 25 down to 6.

Since all children of a node are a lower ID than its parent, the system uses this information to determine the common ancestor that connects the left branch to the right branch. The ancestor is found by finding the node whose ID is greater than or equal to the right node ID in the path. For a given node-to-node path, the hop count is obtained by counting the number of connections from the left node to the common ancestor via the parent links, and then by counting the number of connections from the right node to the common ancestor via the parent links. It is understood that traversing the parent links allows for the most direct path between two nodes. Thus, the hop count for a path can be obtained by counting these links. For example, the path node from 0 to node 1 would be traversed by adding the links from node 0 to its common ancestor, node 4, and then by adding the links from node 1, to its common ancestor, also node 4. The number of links, or hops, from node 0 to node 1 is 3; these are hops from nodes 0 to 4, nodes 1 to 3, and nodes 3 to 4. As the hop counts for the six paths are generated, the highest one is saved as the maximum hop count. Upon completion, the maximum number of hops is three.

Once the number of maximum number of hops is obtained, this number is used to look up the transmission gap time in a lookup table. This transmission gap time is then encoded into the PHY Configuration Packet that is sent to all nodes on the 1394 bus to set the new gap time. Section 4.3.4.3 of P1394/Draft 7.0v0 gives a full description of the PHY Configuration Packet according to the 1394 standard. Since the nodes default to the maximum transmission gap time following a reset, the PHY Configuration Packet is transferred only if the new gap time is less than this prior maximum.

While the invention has been particularly shown and described with reference to a preferred embodiment, it will be understood by those skilled in the art that various changes in form and detail may be made therein without departing from the spirit and scope of the invention.

APPENDIX A

The "C" language style procedure below is used to describe the algorithm which will determine the maximum number of cable hops between any two nodes on the 1394 bus.

```
maxhops = 0;                                                  // initialize maximum hop count
highest_node = root;                                          // save highest node (root) as the total number
                                                              //   of nodes (0 based)
if (highest_node !=0)                                         // topology must have more than 1 node
                                                              //   to have a cable hop
    for (node1 = 0; node1<=highest_node-1;node1++)            // for node1 = 0 to highest_node-1
        if(node[node1].leaf == 1)                             // if node1 is a leaf,
                                                              //   then continue with this path, else skip this node
    for (node2 = node1 + 1; node2<=highest_node; node2++)     // for node2 = node1 + 1 to highest_node
        if (node[node2].leaf == 1) OR (node2 == root)         // if node2 is a leaf or node2 is the root
        {                                                     // then continue with this path, else skip this node
            hops = 0;                                         // initialize hop count for this new path
            left = node1;                                     // node1 will always be left of the common ancestor
            right = node2;                                    // node2 will always be right of the common ancestor
            do
            {
                left = node[left].parent;                     // move up the left branch
                hops++;                                       // increment hop count
            }
            while (right > left);                             // traverse the left branch of the common ancester
            while (right < left)                              // traverse the right branch of the common ancestor
            {
                hops++;                                       // increment hop count
                right = node[right].parent;                   // move up the right branch
            }
            if (hops> maxhops)                                // if hop count of path is greater than the existing
                maxhops = hops;                               // count, then make this the new maximum
        }
```

We claim:

1. In a computer system comprising an acyclic serial bus having a plurality of nodes forming a tree topology with a root node, each node being coupled to at least another node via a transmission cable, a method for determining the maximum cable segments between all possible node to node paths on said acyclic serial bus and optimizing transmission gap_time for the acyclic serial bus, comprising the steps of:

upon establishing a node mapping of said topology, selecting a first node and a second node in the plurality of nodes forming the tree topology;

determining the number of node connections from said first node to a common ancestor node to said second node;

establishing the number of node connections from said second node to said common ancestor node;

establishing said maximum cable segments as equal to the sum of the number of node connections as between both said first node and said second node to said common ancestor node;

associating said maximum cable segments with a transmission gap time for optimum performance of said serial bus;

encoding said transmission gap time into a bus configuration packet;

sending said bus configuration packet to said plurality of nodes on said serial bus to establish said transmission gap time as the serial bus interpacket gap time;

upon a serial bus reset, comparing said bus configuration packet containing said transmission gap time to a new optimum transmission gap time; and replacing said transmission gap time with said new transmission gap time if said new transmission gap time is less than said transmission gap time to optimize transmission gap time for the serial bus.

2. The method according to claim 1, wherein said node connections between said first node and second node to said common ancestor node are parental link nodes between said first node and said common ancestor node, and between said second node and said common ancestor node.

3. In a computer system comprising an acyclic serial bus having a plurality of nodes forming a tree topology with a mot node, each node being coupled to at least another node via a transmission cable, a method for determining the maximum cable hop counts on said serial bus and optimizing transmission gap time for the acyclic serial bus, comprising the steps of:

upon establishing a node mapping of said topology, selecting a source node and a destination node in the plurality of nodes forming the tree topology;

starting with said source node, following a parental node path to determine the number of rode connections along said parental node path from said source node to a common ancestor node;

starting with said destination node, following a second parental node path back to said common ancestor node;

determining the number of node connections along said second parental node path from said destination node to said common ancestor node;

establishing said maximum cable hop count as equal to the sum of the number of node connections along both parental node paths from said source node and said destination node to said common ancestor node;

performing the above steps for each leaf-node-to-leaf-node and leaf-node-to-root-node combination;

determining the maximum hop count based on all evaluated paths;

associating said maximum hop count with a transmission gap time;

encoding said transmission gap time into a bus configuration packet;

sending said bus configuration packet to said plurality of nodes on said acyclic serial bus to establish said transmission gap time as the acyclic serial bus gap time;

upon a serial bus reset, comparing said bus configuration packet containing said transmission gap time to a new transmission gap time; and replacing said transmission gap time with said new transmission gap time if said new transmission gap time is less than said transmission gap time to optimize the transmission gap time for the acyclic serial bus.

4. The method according to claim 3, wherein said node connections between said source node and said destination node to said common ancestor node are parental link nodes between said source node and said common ancestor node, and between said destination node and said common ancestor node.

5. The method according to claim 3, wherein said parental node paths include only leaf-to-leaf node paths and leaf-to-root node paths.

6. In a computer system comprising an acyclic serial bus having a plurality of nodes forming a tree topology with a root node, each node being coupled to at least another node via a transmission cable, a system for determining the maximum cable segments on said acyclic serial bus and optimizing transmission gap time for the acyclic serial bus, comprising:

means for selecting a first node and a second node based upon a node mapping of said tree topology;

means for determining the number of node connections from said first node to a common ancestor node to said second node; means for establishing the number of node connections from said second node to said common ancestor node;

means for establishing said maximum cable segments number as equal to the maximum number of node connections between all possible leaf to leaf paths or leaf to root paths;

means for associating said maximum cable segments number with a transmission gap time;

means for encoding said transmission gap time into a physical configuration packet;

means for sending said physical configuration packet to said plurality of nodes on said serial bus to establish said transmission gap time as the serial bus gap time;

means for comparing said physical configuration packet with said transmission gap time to a new transmission gap time; and means for replacing said transmission gap time with said new transmission gap time if said new transmission gap time is less than said transmission gap time to optimize the transmission gap time for the acyclic serial bus.

7. The system according to claim 6, wherein said node connections between said first node and said second node to said common ancestor node are parental link nodes between said first node and said common ancestor node and between said second node and said common ancestor node.

8. The system according to claim 6, wherein said means for comparing operates upon the occurrence of a serial bus reset.

* * * * *